(No Model.)
J. T. RICHARDS.
OIL RETAINING DEVICE FOR AXLES.
No. 560,539. Patented May 19, 1896.
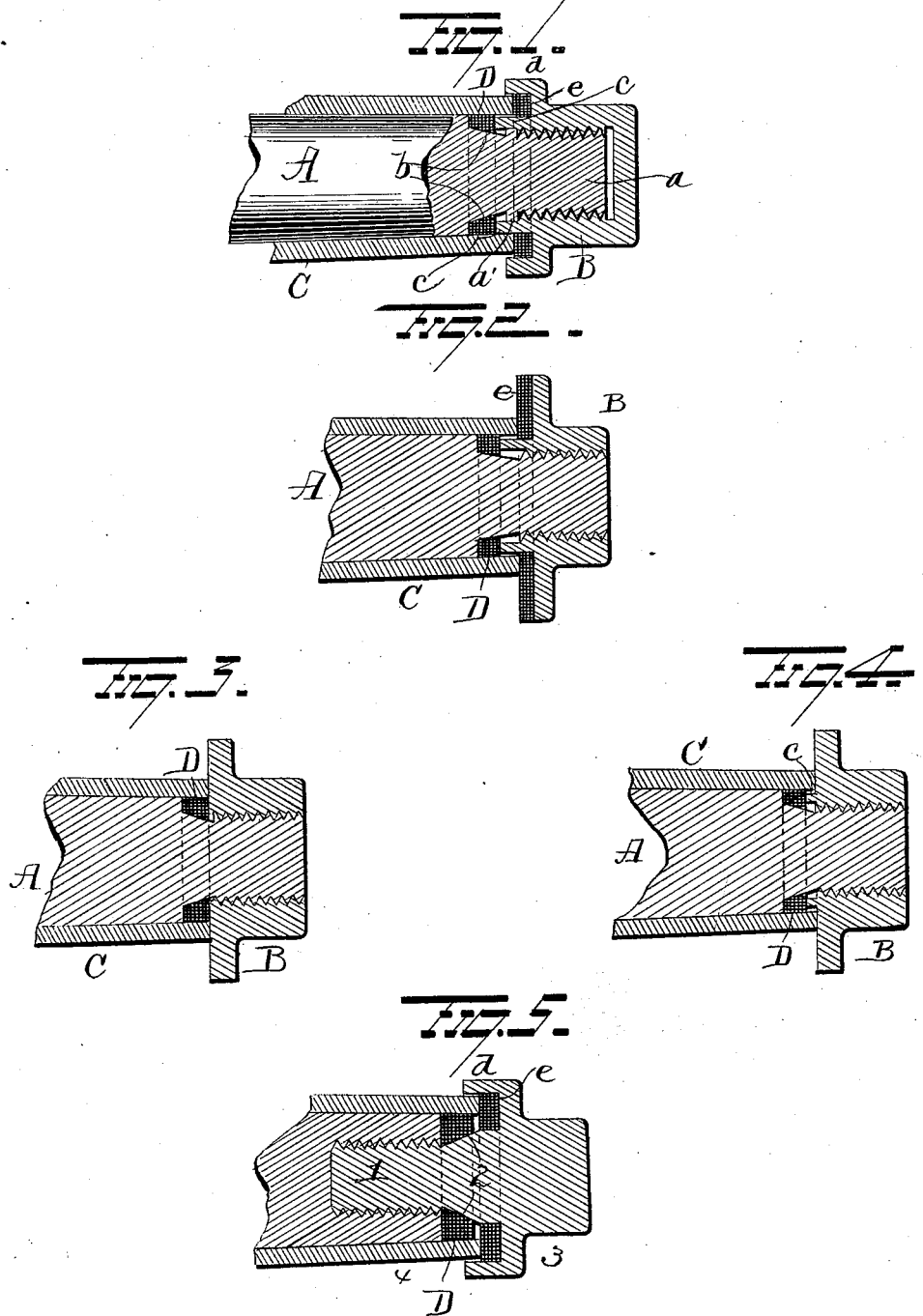
Witnesses
E. J. Nottingham
G. F. Downing
Inventor
J. T. Richards
By H. A. Seymour
Attorney

UNITED STATES PATENT OFFICE.

JOHN T. RICHARDS, OF GARDINER, MAINE.

OIL-RETAINING DEVICE FOR AXLES.

SPECIFICATION forming part of Letters Patent No. 560,539, dated May 19, 1896.

Application filed July 25, 1895. Serial No. 557,153. (No model.)

*To all whom it may concern:*

Be it known that I, JOHN T. RICHARDS, a resident of Gardiner, in the county of Kennebec and State of Maine, have invented certain new and useful Improvements in Oil-Retaining Devices for Axles; and I do hereby declare the following to be a full, clear, and exact description of the invention, such as will enable others skilled in the art to which it appertains to make and use the same.

My invention relates to an improvement in oil-retaining devices for axles, the objects of the invention being to produce means for preventing the escape of oil from an axle-arm, which means shall be simple in construction, cheap to manufacture, easy to apply to any axle-arm, and which shall be effectual in all respects in the performance of their functions.

With these objects in view the invention consists in certain novel features of construction and combinations and arrangements of parts, as hereinafter set forth, and pointed out in the claims.

In the accompanying drawings, Figure 1 is a sectional view showing my improvements. Figs. 2, 3, 4, and 5 are views illustrating modifications.

A represents an axle-arm having a screw-threaded shank $a$ for the reception of a nut B. The axle-arm A is made with a neck, preferably conical, in rear of the screw-threaded shank $a$, so as to produce an annular face $b$, and said neck, when conical, can be made largest at its inner end and at its outer end next to the shank $a$ of a diameter slightly less than the diameter of said shank through the screw-threads and slightly greater than the diameter of the shank between the screw-threads—that is to say, the outer or smaller end of the neck or inclined face $b$ terminates in a plane between the planes of the edges of the screw-threads on the shank $a$ and the plane marked by the base of said threads.
The axle-box C on the arm A is made of sufficient length to project beyond the inclined face $b$, and in the space between the end of the box C and the inclined face or conical neck $b$ a washer D is located. Against this washer (which may be made of a series of small washers) the edge of an annular flange $c$ on the nut B is made to bear, and said annular flange is made with a smooth inner face, and its edge is also preferably ground smooth. The shank $a$ is made with a shoulder $a'$, against which the nut B abuts.

The nut B is made with an annular flange $d$, adapted to embrace the end of the axle-box C. Within the flange $d$ and between the end of the axle-box and the nut a washer $e$ is disposed. In assembling the parts the washer or washers D will be screwed over the shank $a$ and made to bear on the neck $b$, after which the nut B and washer $e$ will be placed in position. As the nut B is screwed on the shank $a$ the annular flange $c$ will bear against the washer D and force it forward into intimate contact with the inner face of the axle-box C, which intimacy of contact is increased when the neck is conical, and thus prevent the escape of oil from the axle-arm. When the nut B is removed, the engagement of the washer D with the inner face of the axle-box will be relieved and said washer will be permitted to move slightly outwardly on the conical neck or inclined face $b$, but will be prevented from escaping by the threads of the shank $a$.

In the form of the invention shown in Fig. 2 the annular flange $d$ is omitted and the washer $e$ made to extend to the outer edge of the nut.

In the form of the invention shown in Fig. 3 both flanges $c$ and $d$ are omitted and the nut made to bear directly against the washer D.

In Fig. 4 the nut B is shown provided with the inner annular flange $c$, but omitting the flange $d$ and washer $e$.

In the form of the invention shown in Fig. 5 the nut is made in the form of a bolt, having a screw-threaded shank 1 adapted to enter an internally-screw-threaded socket in the end of the axle-arm. The inclined face or conical neck 2 (corresponding to the conical neck or inclined face $b$ in the forms of the invention above described) is made between the screw-threaded shank 1 and the body portion 3 of the bolt or nut. The flange $d$ and washer $e$ will preferably be retained in this form of the invention. It will be seen that when the nut or bolt is screwed into the axle-arm the washer D will be made to engage the inner face of the box 4 in the same manner as above explained. Besides preventing the escape of oil, my improvements constitute an excellent antirattler.

My improvements are exceedingly simple in construction, cheap to manufacture, easy to apply to any axle-arm, and are effectual in every respect in the performance of their functions.

Other slight changes than those above described might be made in the details of construction of my invention without departing from the spirit thereof or limiting its scope, and hence I do not wish to limit myself to the precise details of construction herein set forth; but, Having fully described my invention, what I claim as new, and desire to secure by Letters Patent, is—

1. The combination with an axle-arm, and an axle-box projecting beyond the end of the body portion of the arm, of a nut screwed to this arm, one of said parts having a tapering neck located within and opposite that portion of the box which projects beyond the body portion of the axle-arm, and a washer located in the annular space formed between and bounded by the axle-arm, the tapering portion, the box and the nut, substantially as set forth.

2. The combination with an axle-arm, an axle-box projecting beyond the body portion of the arm and nut screwed to the arm, one of said parts, (the arm or nut) having a tapering portion whereby an annular space is formed in the recess formed between the arm, the box and the nut, and two washers one in this space and one located between the nut and the extreme end of the box, substantially as set forth.

3. The combination with an axle-arm having a threaded outer end and a tapering neck smaller than the body portion and between the latter and the threaded portion, of a box projecting slightly beyond the body portion, a washer in the space at the end of the body portion, and a nut screwed on the threads and bearing on the washer and compressing it in the space, substantially as set forth.

4. The combination with an axle-arm having a screw-threaded shank and a conical neck in rear of said shank, of a washer on said neck, a nut on the shank bearing against said washer, an axle-box extending over said conical neck, a flange on the nut adapted to embrace the end of the axle-box and a washer within said flange and between the nut and axle-box, substantially as set forth.

5. The combination with an axle-arm having a screw-threaded shank and a conical neck in rear of said shank, of an axle-box extending over said neck, a washer on said neck, a nut on the shank, an annular flange on the nut bearing against said washer, an annular flange on the nut embracing the end of the axle-box, and a washer between the end of the axle-box and the nut, substantially as set forth.

6. The combination with an axle-arm and a screw-threaded shank at the end thereof, of a conical neck between said shank and the axle-arm, the inner end of said conical neck terminating between the edges of the screw-threads and the base of said screw-threads, a washer on said neck an axle-box and a nut on the shank adapted to bear on said washer, substantially as set forth.

In testimony whereof I have signed this specification in the presence of two subscribing witnesses.

JOHN T. RICHARDS.

Witnesses:
A. E. HARMON,
GEO. W. HESELTON.